US006897901B2

(12) United States Patent
Miller

(10) Patent No.: US 6,897,901 B2
(45) Date of Patent: May 24, 2005

(54) CIRCUIT FOR COMBINING AKB AND SELECTIVE BEAM CURRENT LIMITING AND PROJECTION TELEVISION SYSTEM UTILIZING SAME

(75) Inventor: William G. Miller, Knox County, TN (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 589 days.

(21) Appl. No.: 10/022,172

(22) Filed: Dec. 13, 2001

(65) Prior Publication Data

US 2002/0130965 A1 Sep. 19, 2002

Related U.S. Application Data

(60) Provisional application No. 60/275,722, filed on Mar. 14, 2001.

(51) Int. Cl.$^7$ .............................. H04N 5/16; H04N 5/68
(52) U.S. Cl. ...................... 348/379; 348/380; 348/657; 348/697; 315/387
(58) Field of Search ................................ 348/379, 380, 348/377, 173, 657, 658, 809, 655, 678, 689, 690, 691, 697; 315/370, 381, 382.1, 383, 386, 387, 388, 389

(56) References Cited

U.S. PATENT DOCUMENTS

| 4,067,048 A | * | 1/1978 | Norman ....................... 348/380 |
| 4,096,518 A | * | 6/1978 | Tuma et al. ................. 348/380 |
| 4,387,390 A | | 6/1983 | Reneau et al. ................ 358/74 |
| 4,516,152 A | | 5/1985 | Willis .......................... 358/29 |
| 4,562,479 A | * | 12/1985 | McDonald ................... 348/380 |
| 4,599,642 A | * | 7/1986 | Willis .......................... 348/379 |
| 4,679,065 A | | 7/1987 | Umezawa ...................... 358/29 |
| 5,313,294 A | * | 5/1994 | Haferl ......................... 348/377 |
| 5,488,417 A | | 1/1996 | Griepentrog ................. 348/379 |
| 5,889,557 A | * | 3/1999 | Sato ............................ 348/380 |
| 5,894,327 A | * | 4/1999 | Griepentrog ................. 348/379 |
| 6,097,445 A | | 8/2000 | Goto et al. .................. 348/655 |
| 6,188,435 B1 | | 2/2001 | Ahmari et al. .............. 348/380 |
| 6,226,037 B1 | * | 5/2001 | Griepentrog ................. 348/379 |
| 6,614,482 B1 | * | 9/2003 | Griepentrog ................. 348/380 |

FOREIGN PATENT DOCUMENTS

EP          0977443 A2    2/2000    ............ H04N/9/72

* cited by examiner

Primary Examiner—Michael H. Lee
Assistant Examiner—Jean W. Désir
(74) Attorney, Agent, or Firm—John Vodopia

(57) ABSTRACT

A control circuit for use in a video processor utilizes combined automatic kinescope bias (AKB) control, and average individual beam current sensing and limiting in at least one CRT. The control circuit includes automatic kinescope bias (AKB) control circuitry for detecting a magnitude of individual red (R), green (G) and blue (B) cathode currents driving corresponding R, G and B CRTs, generating R, G and B average cathode current control signals therefrom, and using the R, G and B average cathode current control signals as feedback to the video processor to reduce the R, G and B cathode currents approximately equal current amounts. Selective beam current limiting circuitry within the control circuitry compares at least one of the R, G and B average current control signals with a predetermined signal, and whereupon the at least one of the R, G and B average current control signals exceeds the predetermined signal, introducing a gain reduction in corresponding video gain stages within the video processor to limit the at least one of the R, G and B average current control signals.

4 Claims, 5 Drawing Sheets

CIRCUIT FOR COMBINING AKB AND SELECTIVE BEAM CURRENT LIMITING AND PROJECTION TELEVISION SYSTEM UTILIZING SAME

RELATED APPLICATION

This application claims the benefit of U.S. Provisional Application No. 60/275,722, filed Mar. 14, 2001.

BACKGROUND OF THE INVENTION

The invention relates to projection television systems including three separate cathode ray tubes (CRTs), and more particularly, to circuitry for combining automatic kinescope bias (AKB) circuitry with circuitry for sensing and limiting average individual beam current sensing.

Many CRT-based video display systems employ an automatic kinescope bias (AKB) control systems for maintaining proper black image current levels for each electron gun of an associated image displaying kinescope or CRT. The purpose of such AKB control systems in a CRT is to prevent the displayed picture colors and picture grey scale information from being adversely affected by variations in the kinescope bias due to such factors as aging, temperature changes, etc. Conventional AKB control systems include a beam sampling element coupled to a control amplifier in each AKB feedback loop for automatically adjusting the kinescope black level of the electron gun. Adjustment is implemented typically during the blanking period to prevent variability of the black level sampling pulses.

A conventional AKB control system used in a video display system is disclosed in U.S. Pat. No. 4,633,321 (the '321 patent). The '321 patent discloses an apparatus for automatically controlling the bias of an image display device such as a kinescope in a television receiver. The '321 patent apparatus comprises a grid system responsive to a grid drive signal in order to prevent visible artifacts during non-blanking AKB operating periods. More particularly, the kinescope electron gun is caused to conduct a white-going current during plural horizontal line intervals in response to the grid drive signal applied to the kinescope electron gun during a given portion of the AKB bias monitoring interval. The drive signal is blanked during horizontal retrace intervals to eliminate the white current at such times, thereby eliminating visible horizontal line retrace artifacts which would otherwise appear to the uncorrected retrace pattern of planar kinescope.

U.S. Pat. No. 5,488,417 ("the '417 patent") discloses an AKB system which avoids the need for grid drive circuitry to prevent visible artifacts. The '417 patent uses a controllable current source in an AKB circuit to apply a measurement current to a kinescope driver amplifier during selected lines of the vertical interval of a video input signal. The amplified current signal induces a beam current in a kinescope coupled to the driver amplifier. A comparison circuit compares samples of the beam current obtained during the selected lines with a reference signal and applies a correction current to the driver amplifier for regulating a parameter, e.g., black level, of displayed images based on the comparison.

A signal source, coupled to the controllable current source, inhibits production of the measurement current during retrace portions of the selected lines and enables production of the measurement current during trace portions of the selected lines. The benefit of such a construction is that use of the signal source provides for suppression of visible artifacts due to AKB operation.

U.S. Pat. No. 6,188,435 B1 discloses a circuit for controlling beam current using current "pictures" for the R, G, B beam currents in the kinescope or color picture tube. The means for accomplishing the beam current control monitors each individual R, G and B beam current individually to maintain its corresponding picture sharpness and/or peak white maximum beam current, average beam current values per line and per picture. The current pictures correspond to the real currents in the color picture tube, the sum of which is compared with beam current information obtained from the associated high voltage transformer to both correct fluctuations in the millisecond range and long-term drifts. Use of the current pictures enables the beam current control to quickly regulate picture sharpness for the three R, G, B colors as well as total beam current in the picture tube.

In order to generate the current pictures, the beam current control circuit taps or clamps the R, G, B signals in an amplifier including a controllable gain, amplified and weighted by means for gamma correction. The real current ratios in the picture tube are simulated in the current control circuit by the gamma correction means. A weighted sum is formed of the signals and serves as a comparison value with respect to a beam current information value, Icrt. The two information signals are compared, and an output signal is generated by the comparison. The output signal is used to control the gain of the amplifier. The current control circuit thereby monitors the values of each individual R, G, B signals to regulate the R, G, B beam currents and picture sharpness, and the weighted sum together with the output signal of the control circuit are monitored by a decision circuit.

In projection television display systems having three separate CRTs for producing R, G, B light, certain signals such as a high level flat field in an individual primary color can result in the respective CRT providing much more than its nominal share of light. While it is common practice to sense and control the total beam current, under such flat field conditions, one CRT may draw most if not all the beam current ordinarily allocated for all three CRTs. When this occurs, overheating and fracturing of the CRT may occur. This is particularly troublesome in the case of video accessory devices which provide a blue flat field when no program content is being provided.

To accommodate these undesirable signal conditions, it would be effective to determine the relative share of current provided to each CRT. In the prior art, for example, in a Philips/Magnavox GR-9D, the cathode current of the blue CRT is directly measured, with the preceding R, G, B video gains controlled to limit the average blue current to a safe level. The skilled artisan, however, will realize that it is also desirable to utilize individually sampled cathode currents for automatic CRT cut-off stabilization, that is, automatic kinescope bias (AKD) control.

OBJECTS AND SUMMARY OF THE PRESENT INVENTION

Accordingly, it would be a welcome advancement for those skilled in the art to realize a circuit and method which allows the sampled current to simultaneously supply both the AKB control circuitry and blue drive limiting circuitry, with no interaction therebetween.

It is therefore an object of the present invention to provide a control circuit which monitors the average blue beam current, and determines if that blue beam current exceeds a predetermined threshold, introduces a gain reduction in preceding video gain stages to limit the blue beam current, and which, depending on the determined magnitude of the blue beam current, may deploy either AKB or selective beam limiting without the use of special timing signals.

To that end, the present invention discloses a control circuit for use in a video processor which utilizes combined automatic kinescope bias (AKB) control, and average individual beam current sensing and limiting in at least one CRT. The control circuit includes automatic kinescope bias (AKB) control circuitry for detecting a magnitude of individual red (R), green (G) and blue (B) cathode currents driving corresponding R, G and B CRTs, generating at least one of R, G and B average cathode current control signals therefrom, and using at least one of the R, G and B average cathode current control signals as a feedback signal to the video processor to reduce the R, G and B cathode currents approximately equal current amounts. Selective beam current limiting circuitry within the control circuitry compares at least one of the R, G and B average current control signals with a predetermined signal, and whereupon the at least one of the R, G and B average current control signals exceeds the predetermined signal, introducing a gain reduction in corresponding video gain stages within the video processor to limit the at least one of the R, G and B average current control signals.

BRIEF DESCRIPTION OF THE DRAWING FIGURES

The above and other more detailed aspects of the invention will be described in detail hereinafter, by way of example, with reference to the following drawing figures.

DETAILED DESCRIPTION OF THE PREFERRED EMBODIMENTS

The reader should note that the embodiments described herein are for exemplary purposes only, and are not meant to limit the scope and spirit of the invention at all. Only the language of the claims appended hereto shall limit the scope and spirit of the invention.

Figure 1:
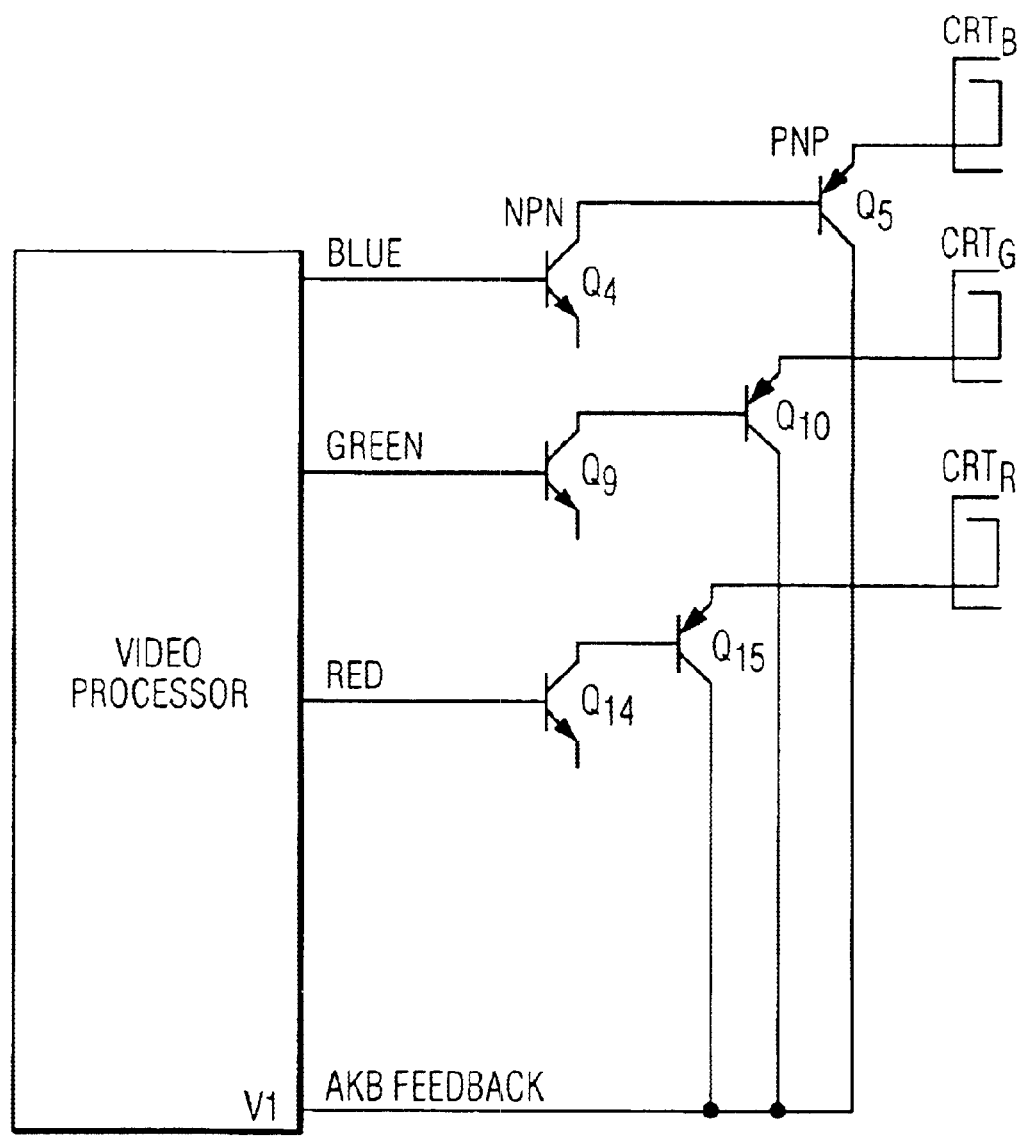
FIG. 1 is a schematic diagram of a conventional Automatic Kinescope bias (AKB) control circuit.

Prior art FIG. 1 shows a video processor with conventional and automatic kinescope bias control. More particularly, the video processor generates and outputs a red (R), green (G) and Blue (B) cathode current signals. The blue cathode current signal is supplied to NPN emitter follower Q4, the collector current of which drives PNP emitter follower Q5. The red cathode current signal is supplied to NPN emitter follower Q9, the collector current of which drives PNP emitter follower Q10. The green cathode current signal is supplied to NPN emitter follower Q14, the collector current of which drives PNP emitter follower Q15. Emitter currents of Q5, Q10 and Q15 drive CRTB, CRTG and CRTR, respectively.

Collector currents of Q5, Q10 and Q15 are fed back to the video process which, using DC bias control, maintains equal nearblack currents, i.e., the blue, green and red video processor outputs shown. The present invention exploits the presence of one at least one of the three currents flowing in through the collectors of respective PNP transistors Q5, Q10 and Q15 to additionally detect average CRT cathode beam currents and determine if they exceed a specific (appropriate) current level. If the particular CRT beam current exceeds the specified level, video drive circuitry is provided with a control signal to control and limit the current level.

Figure 2:
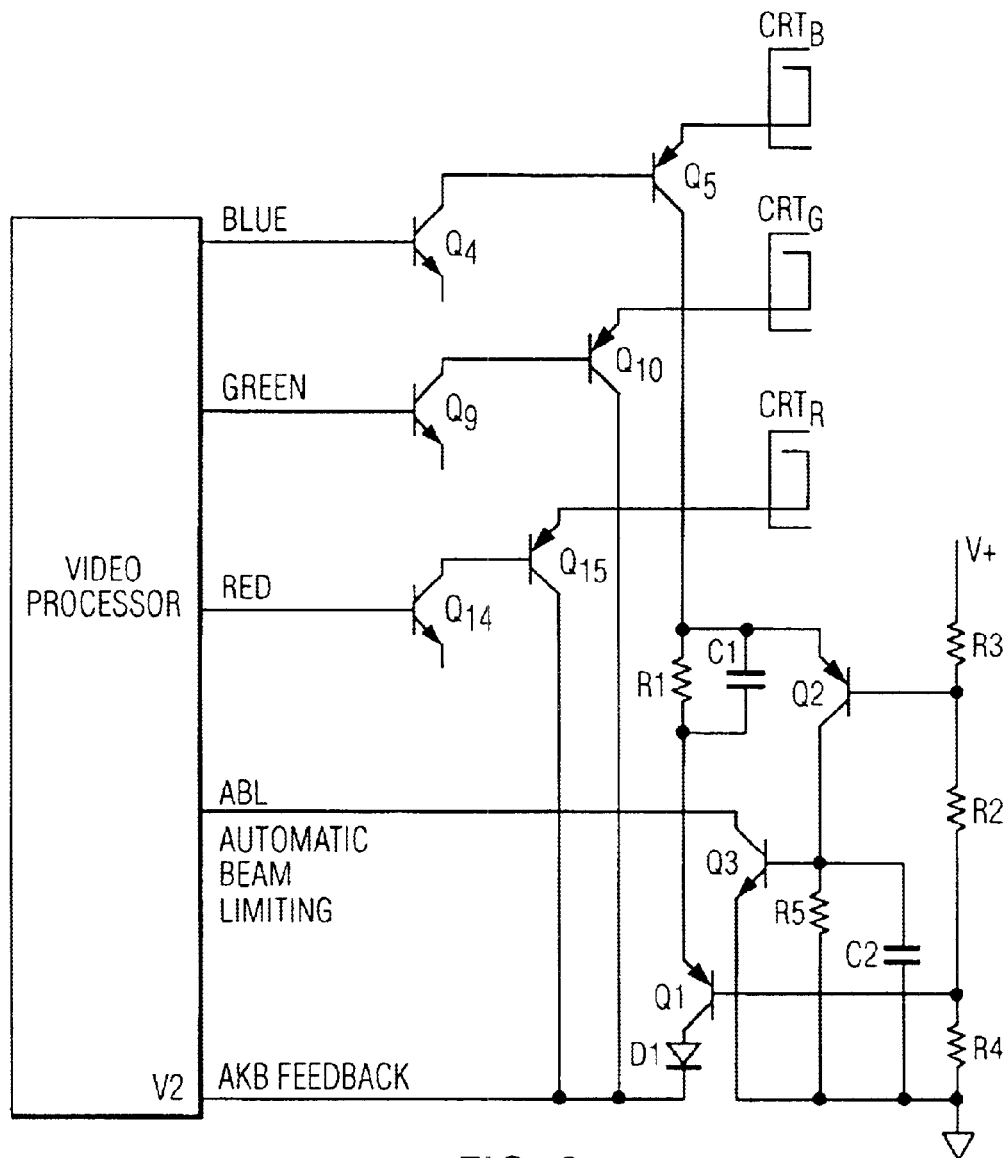
FIG. 2 is a schematic diagram of one embodiment of a circuit of this invention comprising both AKB circuitry and average beam current sensing and limiting circuitry.

FIG. 2 shows a first embodiment of a control circuit of this invention. The FIG. 2 circuit adds average beam current sensing and limiting circuitry to the conventional AKB circuitry shown in FIG. 1 and described above. Only the additional circuitry for one of the driver currents, that is, the blue current is shown and described in order to simplify the drawing and explanation.

The collector current passing through PNP transistor Q5 is approximately equal to the transistor's emitter current driving the blue CRT. The cathode current is therefore returned through resistor R1, PNP transistor Q1 and diode D1 to the AKB feedback port of video processor V2. The voltage drop across R1 is proportional to the average blue beam current. When the voltage drop across R1 exceeds a predetermined threshold current determined by the voltage across resistor R2, PNP emitter follower Q2 and NPN emitter follower Q3 conduct and introduce gain reduction via video gain circuitry internal to video processor V2. Resistor R5 is connected in parallel with a capacitor C2 to provide low pass filtering means to filter the signal driving NPN transistor Q3. The currents output from the blue green and red ports of the video processor are limited thereby. So, depending on the magnitude of the current, either AKB or selective beam limiting is deployed by the inventive circuit without a need for additional special timing signals.

The above-described circuit may be used successfully in a projection television display system with three separate CRTs for producing red, green and blue light (signals).

Figure 3:
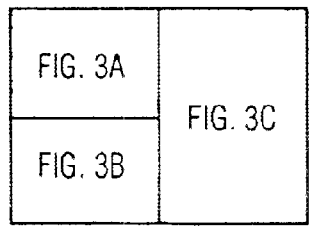
FIG. 3 is a schematic circuit diagram of a proprietary video board which implements the function of the present invention.
Figure 3A:
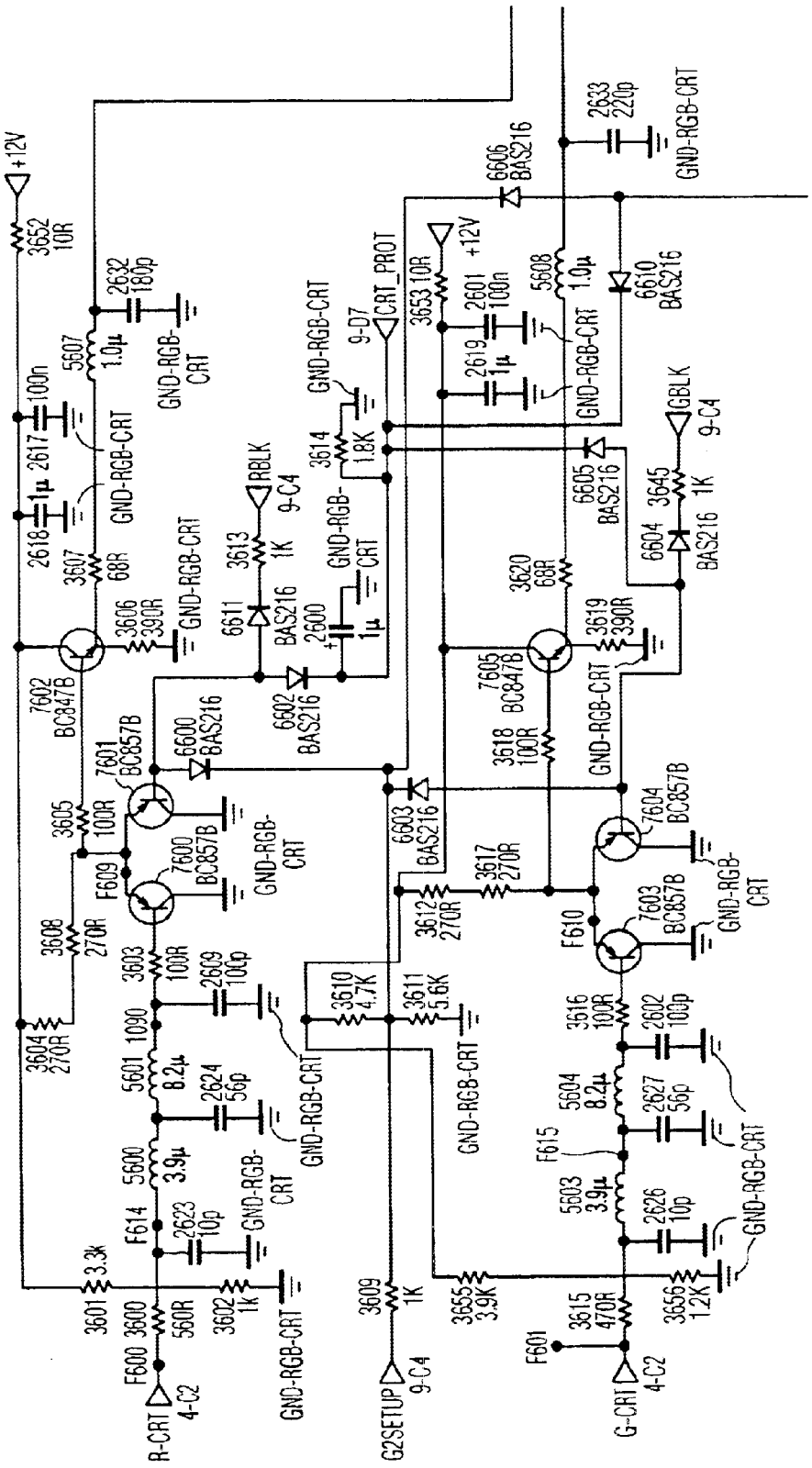
Figure 3B:
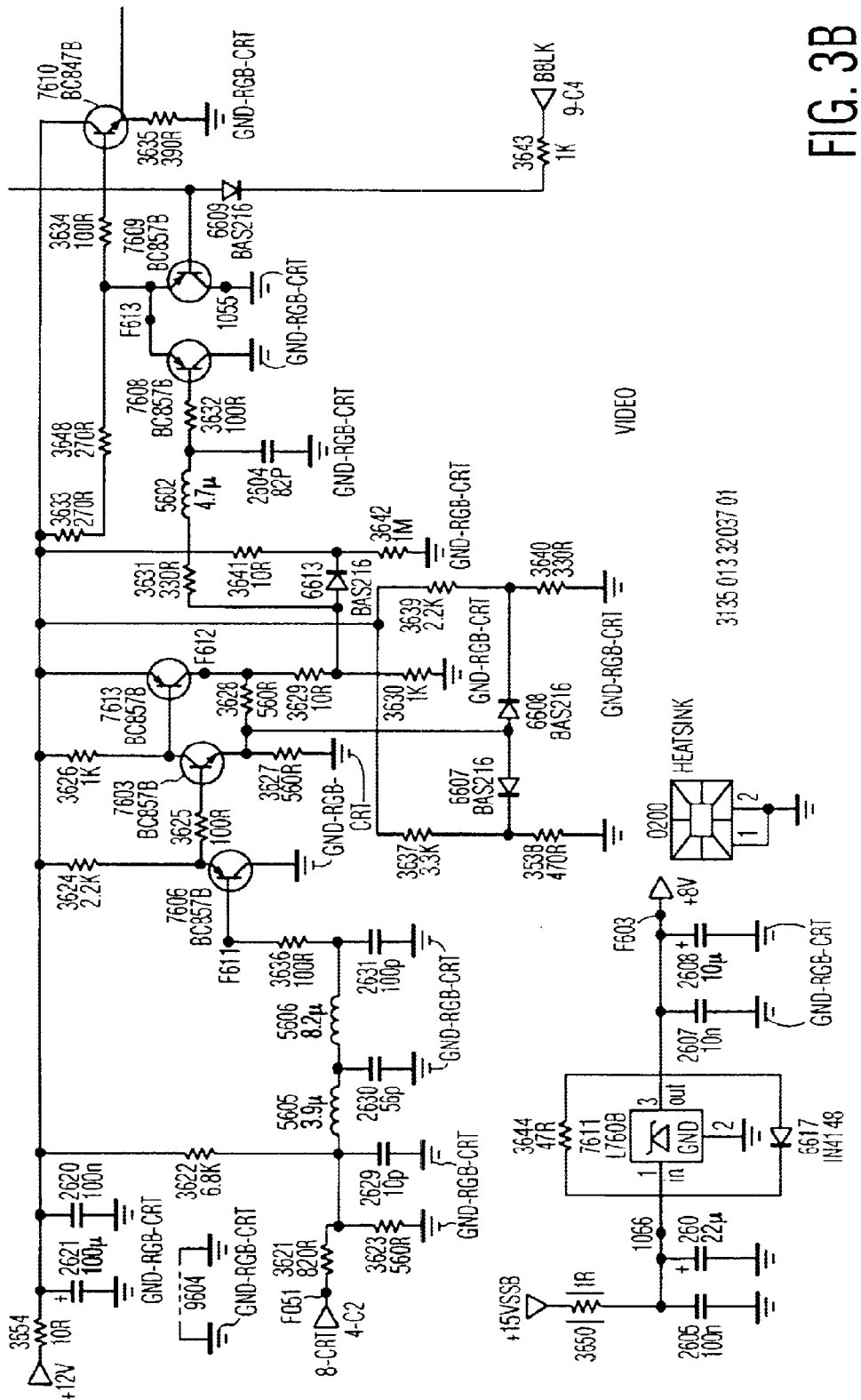
Figure 3C:
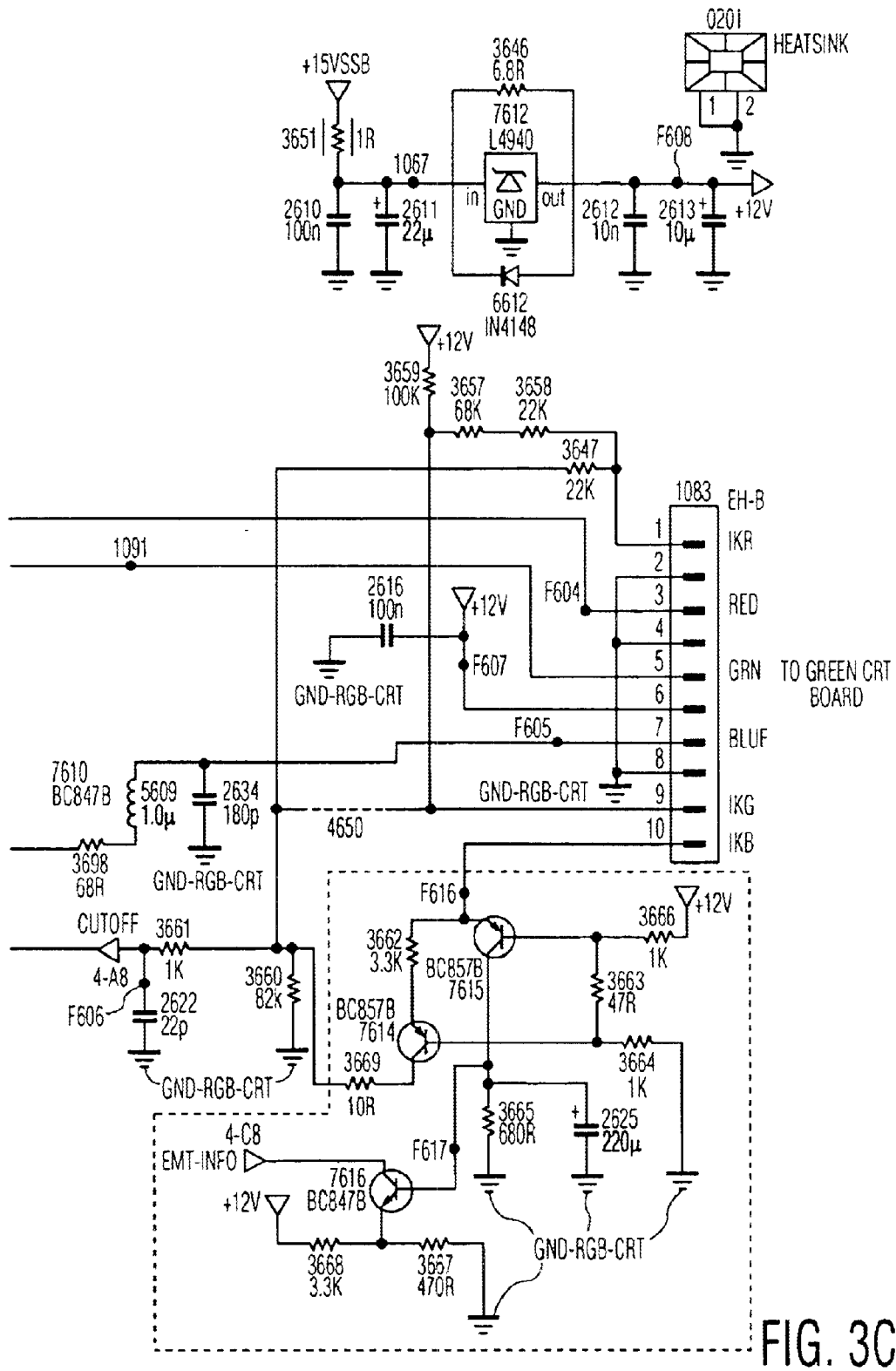

FIG. 3 is a schematic diagram showing a production design of a video processing circuit which implements the concept of this invention, that is, utilizes sampled CRT cathode beam current for both automatic cut-off stabilization and drive limiting circuitry without interaction. One portion of the video processor circuit, portion A shown enclosed by the broken line of FIG. 3, implements the control circuit of the invention.

Portion A performs an equivalent function of the inventive circuitry shown in FIG. 2. The reader should note that portion A only highlights the blue drive portion of the circuitry, as is the case of FIG. 2.

In portion A, PNP transistors 7614 and 7615, and NPN transistor 7616 correspond to PNP transistors Q1 and Q2, and NPN transistor Q3 as shown in FIG. 2. Resistor 3665 and capacitor 2625 correspond to resistor R5 and capacitor C2, resistors 3663, 3666 and 3664 correspond to resistors R2, R3 and R4, resistor 3669 is used in lieu of diode D1, and resistors 3667 and 3668 are included in FIG. 3, but not FIG. 2, and low pass filter combination R1 and C1 of FIG. 2 is not included in FIG. 3. The current flowing at node F616 is equivalent to the current flowing in the collector of PNP transistor Q5.

What is claimed is:

1. A video control circuit for carrying out an automatic kinescope bias control, and an average individual beam current sensing and limiting in respective cathode ray tubes ($CRT_R$, $CRT_G$, $CRT_B$), the video control circuit comprising:
 a video processor (V1); and
 a feedback circuit (F) for feeding back proportions of red (R), green (G), and blue (B) cathode currents driving the corresponding cathode ray tubes ($CRT_R$, $CRT_G$, $CRT_B$) to the video processor (V1) for automatic kinescope bias control by adjusting black levels of the respective cathode currents (R, G, B), the feedback circuit (F) comprising at least one average beam current sensing circuit (A) for sensing the proportion of one of the cathode currents (R, G, B), to feed back a beam limiting signal (VABL) to the video processor (V1) for introducing a gain reduction in video gain stages to limit the red (R), green (G) and blue (B) cathode currents in case the proportion of one of the cathode currents (R, G, B) exceeds a predetermined value, wherein the average beam current sensing circuit (A) comprises:

detection means (R1, C1, Q1) for passing the proportions of red (R), green (G) and blue (B) cathode currents to the video processor (V1) for automatic kinescope bias control in case the proportions of red (R), green (G) and blue (B) cathode currents are below the predetermined value and for detecting the proportions of red (R), green (G) and blue (B) cathode currents in case the proportions of red (R), green (G) and blue (B) cathode currents are above the predetermined value, and sensing means (Q2, R5, C2) for sensing portions of the proportions of red (R), green (G) and blue (B) cathode currents exceeding the predetermined value, and wherein the detection means (R1, C1, Q1) comprises a first resistor (R1) and a first transistor (Q1), the first transistor (Q1) having a control terminal coupled to a first reference voltage, a first main terminal coupled to a first terminal of the first resistor (R1), and a second main terminal coupled to the video processor (V1).

2. The video control circuit set forth in claim 1, wherein the sensing means (Q2, R5, C2) comprises a second resistor (R5) having a first terminal coupled to a second reference voltage and second transistor (Q2) having a first main terminal coupled to a second terminal of the first resistor (R1), a control terminal coupled to a third reference voltage, and a second main terminal coupled to a second terminal of the second resistor (R5).

3. The video control circuit set forth in claim 1, wherein the detection means (R1, C1, Q1) comprises a first capacitor (C1) connected in parallel to the first resistor (R1).

4. The video control circuit set forth in claim 2, wherein the sensing means (Q2, R5, C2) comprises a second capacitor (C2) connected to the second terminal of the second resistor (R2).

* * * * *